United States Patent [19]

Hirota et al.

[11] Patent Number: 4,721,173
[45] Date of Patent: Jan. 26, 1988

[54] AUTOMATIC WEIGHING SYSTEM WITH DENSITY RATIO CONTROL OF VOLUME

[75] Inventors: Ryuichi Hirota, Miki; Shinichi Inoue, Kobe, both of Japan

[73] Assignee: Yamato Scale Company, Limited, Japan

[21] Appl. No.: 26,296

[22] Filed: Mar. 16, 1987

[30] Foreign Application Priority Data

May 2, 1986 [JP] Japan .................................. 61-102562

[51] Int. Cl.⁴ ...................... G01G 19/22; G01G 19/52
[52] U.S. Cl. ........................................ 177/25; 177/1; 177/50
[58] Field of Search ........................... 177/1, 25.18, 50

[56] References Cited

U.S. PATENT DOCUMENTS 4,548,286 10/1985 Sashiki ............................ 177/50 X Primary Examiner—George H. Miller, Jr.
Attorney, Agent, or Firm—Senniger, Powers, Leavitt and Roedel

[57] ABSTRACT

An automatic weighing system for delivering quantities of product measured by weight, each quantity having a weight equal or approximate to a predetermined target weight, in such manner that the volume of each quantity falls always within a predetermined allowable range even when the product to be weighed has a substantial variance in its apparent density or specific gravity. The system includes means for measuring the apparent density and means for controlling the target weight in accordance with the measured value of apparent density.

6 Claims, 7 Drawing Figures

4,721,173

AUTOMATIC WEIGHING SYSTEM WITH DENSITY RATIO CONTROL OF VOLUME

BACKGROUND OF INVENTION

This invention relates to an automatic weighing system for delivering quantities of product measured by weight so as to keep both the weight and volume of each delivery within respective allowable ranges.

An example of this type of weighing system is disclosed in U.S. Pat. No. 4,548,286. The patented system was proposed for packing product as cornflakes or potato chips which vary considerably in size and shape and, consequently, in their apparent density or specific gravity, so that both the weight and volume of each pack falls within respective predetermined allowable ranges. To this end, the system uses a combination weighing device including a plurality of weighers for weighing quantities of product representing fractions of the final package amount, for generating combinations of the fractional weights and comparing the combined weights with a predetermined target weight to select a combination satisfying a predetermined weight condition. The system controls the target weight in accordance with an average density of the product measured by an associated apparent density detector.

In this system, the measured average density is compared with a predetermined upper threshold density. The target weight is maintained when the measured density is lower than the upper threshold density. When the former exceeds the latter, however, the target weight is corrected by calculating a difference between the average and threshold densities and adding a product of the difference and a predetermined value to the target weight.

In the above-cited system, the target weight is maintained when the average density is lower than the upper threshold density. Therefore, if the average apparent density should become very low, that is, if the product piece size should become very large, there would be a risk of overflow of product from the package. Although the cited patent also discloses a conditioner for regulating the volume of each delivery, such overflow cannot be avoided since system does not respond to the average apparent density.

SUMMARY OF THE INVENTION

Accordingly, an object of this invention is to provide an improved automatic weighing system which can avoid the above-mentioned overflow problem and also keep the volume of each pack well above an allowable level.

According to this invention, an automatic weighing device comprises weighing means for delivering quantities of product measured by weight in such a manner that each quantity has a weight value equal or approximate to a target weight, means for measuring an apparent density of the product fed to the weighing means, and means for controlling the target weight based upon the measured apparent density. The target weight controlling means of this invention includes means for calculating a ratio of the measured density to a predetermined reference density, means for multiplying the target weight by the calculated ratio to provide a corrected target weight, and means for comparing the measured density with a predetermined lower threshold density and the reference density to actuate an alarm when the measured density is lower than the lower threshold density, to provide the uncorrected target weight to the weighing means when the measured density is between the lower threshold density and the reference density and to provide the corrected target weight to the weighing means when the measured density is higher than the reference density.

These and other objects and features of this invention will be described below with reference to the accompanying drawings.

BRIEF DESCRIPTION OF DRAWINGS

In the drawings.

Throughout the drawings, the same reference numerals are given to like or corresponding structural components.

DESCRIPTION OF PREFERRED EMBODIMENTS

Figure 1:
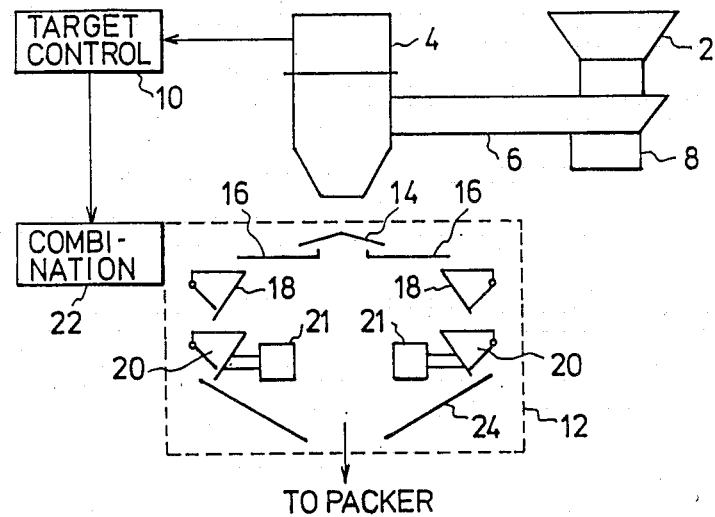
FIG. 1 is a schematic view representing a combination weighing machine having associated therewith a density measuring device according to this invention.

Referring to FIG. 1, an apparent density measuring device 4 is provided with a hopper 2 for holding a relatively large quantity of product to be weighed and a conventional vibration conveyer 6 driven by a suitable vibrator 8 for conveying the product from the hopper 2 to the device 4. The device 4 serves to sample a specific known volume of product from the conveyer 6 and weigh it to send the measured weight to a target weight control unit 10 which will be described later.

A conventional combination weighing machine 12 is disposed under the apparent density measuring device 4 for receiving the product discharged from the device 4. The combination weighing machine 12 includes a dispersion feeder 14 for receiving product from the device 4 and radially dispersing it for final distribution to a plurality of radial conveyer troughs 16. As is well known in the art, the dispersion feeder 14 and conveyer troughs 16 are vibrationally driven by known means, not shown, to feed a selected amount of product to each of underlying pool hoppers 18. Each pool hopper temporarily holds this amount of product and drops it into an underlying weigh hopper 20 in response to a command signal. The product in each weigh hopper 20 is weighed by an associated weigher 21 which provides the measured weight to a combination arithmetic unit 22. The unit 22 effects a so-called combination selecting operation with the measured weights from respective weighers 21, compares the resultant combination weights with a target weight fed from the target weight control unit 10, and discharges product from selected weigh hoppers 20 into a collection chute 24 for delivery to a succeeding step such as packing. No further description will be made on the combination weighing machine and process, since they are well known in the art and have no direct connection to this invention.

Figure 2:
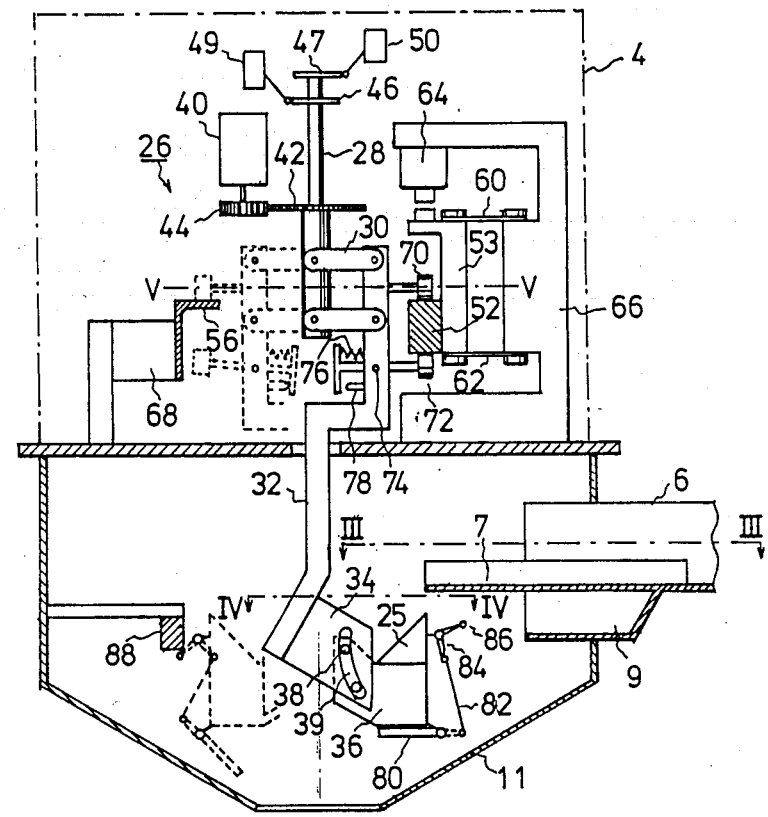
FIG. 2 is a schematic sectional side view representing a mechanical structure of the density measuring device embodied in FIG. 1.
Figure 3:
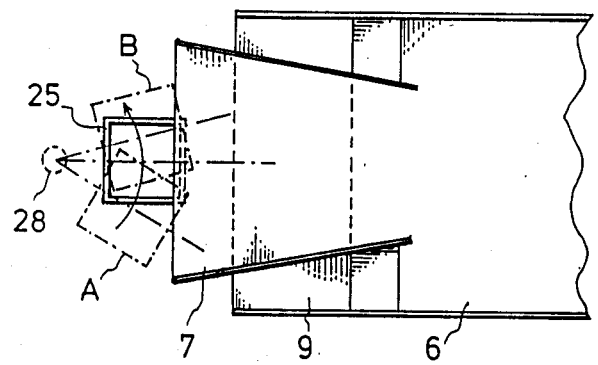
FIG. 3 is a partial plan view along line III—III of FIG. 2.

Now, the description will be made about a preferred embodiment of the apparent density measuring device 4 with reference to FIGS. 2 through 6. As shown in FIG. 2, the output end of the vibration conveyer 6 extends into the lower part of the device 4 and is divided into upper and lower floors 7 and 9. As shown in FIG. 3, the upper floor 7 widens in the forward (downstream) direction and the width its root (i.e., upstream end) occupies only a part of the overall width of the conveyer 6, so that some of the product conveyed by the conveyer 6 progresses along the upper floor 7 and the remainder falls onto the lower floor 9. Product is conveyed along the upper and lower floors until it falls into a bottom chute 11 of the device 4 for delivery to the underlying combination weighing machine 12 (FIG. 1).

A sampling bucket 25 is disposed directly under the forward end of the upper floor 7 of the conveyer 6 and has a width less than the width of the forward end of the upper floor 7 for sampling a part of the product falling from that end, as shown in FIG. 3. As shown by an arrow in FIG. 3, the sampling bucket 25 revolves about the vertical axis of a rotating shaft 28 of a driving mechanism 26 and receives product during its passage under the forward end of upper floor 7. While the flow rate of product on the conveyer 6 will be limited by the demand of the associated combination weighing machine, it must be sufficient for causing overflow from the bucket 25. It will be understood in this regard that the volume of product sampled by the bucket 25 is determined by the angle of slide of the product, which is the maximum slope at which the product may be piled above the top of the bucket without sliding off the bucket. This "angle of slide" will vary from product to product. Therefore, the bucket dimension and revolving speed should be selected accordingly.

Figure 4:
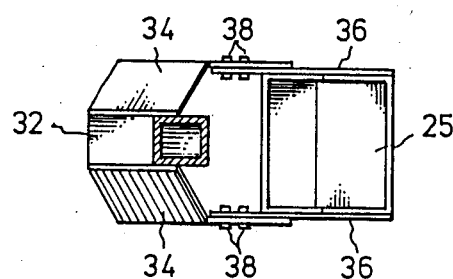
FIG. 4 is a partial sectional plan view along line IV—IV of FIG. 2.
Figure 5:
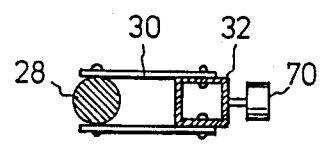
FIG. 5 is a partial sectional plan view along line V—V of FIG. 2.

As shown in FIG. 5, the rotating shaft 28 is coupled to a bucket hanger post 32 by a parallel-guiding linkage mechanism 30 and the bucket 25 is coupled to the post 32 by two pairs of coupling plates 34 and 36, as shown in FIG. 4. As shown, the coupling plates 34 fixed to the post 32 have curved slots 39 and the coupling plates 36 fixed to the bucket 25 have guide pins 38 received in the slots 39 for enabling optional adjustment of the inclination of bucket 25. As shown in FIG. 2, the side walls of the sampling bucket 25 are triangularly shaped and this shape and variable inclination of the bucket 25 make it possible to change the volumetric content of the bucket 25.

The rotating shaft 28 is continuously driven by a motor 40 through gears 42 and 44 and two cam plates 46 and 47 are fixed to this shaft 28 for actuating microswitches 49 and 50, respectively. The function of these cams and switches will be described later.

Figure 6:
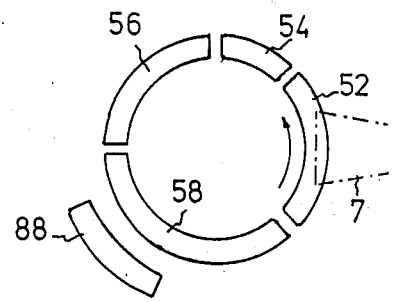
FIG. 6 is a plan view representing the guide rail configuration of the device of FIG. 2.

As shown in FIG. 6, four circular arc rails 52, 54, 56 and 58 are arranged coaxially with the rotating shaft 28. The rail 52 is disposed directly above the forward end of the upper conveyer floor 7 as shown in phantom in the drawing. As shown in FIG. 2, this rail 52 has a substantial thickness in the vertical direction and is fixed to a movable member 53 which is supported through leaf springs 60 and 62 by a bracket 66. The member 53 and, in turn, the rail 52 can be vibrated by means of an electromagnet 64 energized with a.c. power. The other rails 54, 56 and 58 are relatively thin. The rail 56 is supported by a load cell 68, while the rails 54 and 58 are directly fixed to the machine base.

A roller 70 is attached to the hanger post 32 so as to roll in a generally horizontal plan on these rails 52, 54, 56 and 58. Therefore when the roller 70 is rolling on rail 56, the load cell 68 is loaded with the total weight of the hanger post 32, sampling bucket 25 and like for detecting the weight of product in the bucket 25. Another roller 72 is supported on a shaft which is pivoted at 74 on the hanger post 32, and is urged to the bottom face of the rail 52 by a spring 76 as shown in FIG. 2. Accordingly, while the roller 70 rolls on the rail 52, the hanger post 32 and the sampling bucket 25 are fixed vertically with respect to the vibrating member 53 to vibrate therewith. When the roller 52 is on the other rails, however, the lower roller 72 is maintained spaced from the rails by means of a stopper 78 as shown in phantom in FIG. 2.

The sampling bucket 25 has a gate door 80 for closing normally its bottom opening. The door 80 is linked through a connecting rod 82 to a lever 84 having a small roller 86 pivoted at its distal end. Another arcuate rail 88 is disposed coaxially with the aforementions rails 52 through 58, as shown in FIG. 6, so as to deflect the roller 86 to open the gate door 80 as shown in phantom, for discharging the contents of the bucket 25.

As described above, the sampling bucket 25 revolves under the upper floor 7 of the conveyer 6 as shown by the arrow in FIG. 3. The aforementioned cam plate 46 is shaped and arranged to actuate the associated microswitch 49 from position A to B (see FIG. 3) of the bucket 25 so that the electromagnet 64 is energized thereby to apply vertical vibration to the bucket 25 for this time interval. After the vibration ceases, additional product is fed to the bucket 25 until it overflows from the bucket. On the other hand, cam plate 47 is shaped and arranged to actuate the microswitch 50 when the roller 70 passes a point on rail 56 at which the weight signal of the load cell 68 becomes stable. The switch 50 serves to pass the weight signal to the target weight control unit 10.

As described above, the sampling bucket 25 of the inventive device is filled with product as uniformly as possible by the aid of vibration to until product finally overflows from the bucket. It has been found that this process can substantially reduce the variance in measurements. The sampling operation may be effected periodically or on demand. The microswitch 50 may be interlocked with the conveyer 6 so as to prevent the weight signal from being delivered when no product is fed to the bucket 25.

Figure 7:
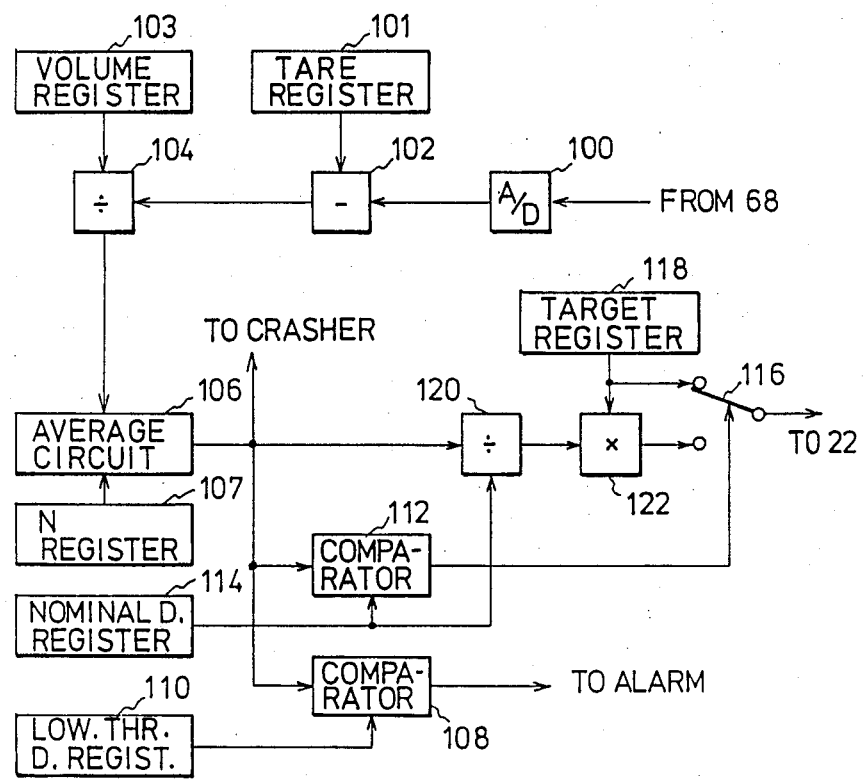
FIG. 7 is a schematic block diagram representing a circuit arrangement of a target weight control system to which the density measuring device is effectively applicable.

A preferred circuit arrangement of the target weight control unit 10 is shown in FIG. 7. The weight signal from the load cell 68 (FIG. 2) is digitized by an analog-to-digital (A/D) convertor 100 and applied to a subtracter 102. The subtracter 102 also receives from a tare register 101 a digital tare signal corresponding to the load applied to the load cell 68 when the sampling backet 25 is empty, and subtracts this signal from the weight signal from A/D convertor 100 to provide an output signal indicative of the weight of product in the bucket 25 to a divider 104.

A reference volume register 103 is previously loaded with a predetermined volume value which corresponds to an average volume of product necessary to fill the sampling bucket 25. The divider 104 divides the input weight signal by a reference volume signal from the register 103 to provide an apparent density signal. If a unit volume is adopted as the reference volume, the output of subtracter 102 can be used as the apparent density signal.

The apparent density signal is applied to an averaging circuit 106. This circuit 106 is arranged to always store N-number of input density signals by removing the oldest signal upon reception of a new signal, and to average the stored signals by N which is preset in a N-register 107, thereby providing an average density signal for target value control. The reason for using average density rather than the current density from the divider 104 for this purpose is to prevent excessive response of the control system. Therefore, this averaging process may be omitted according to circumstances.

The average density signal from the averaging circuit 106 is applied to a comparator 108 and compared with an allowable lower threshold density which is preset in a lower threshold density register 110. The lower threshold density is determined taking into consideration the volume of product which can be packed in a specified container without overflow and the least volume of product which must be packed in the container. The comparator 108 is arranged to provide a signal to a suitable alarm device (not shown) to actuate it when the average density is lower than the lower threshold density, thereby informing the operator of possible overflow of product from packages.

The average density signal from the averaging circuit 106 is also applied to another comparator 112 and compared with a nominal density which is preset in a nominal density register 114. The nominal density is determined based upon the normal weight and volume of product preferably packed in each package. The comparator 112 is arranged to provide a switching signal to a change-over switch 116 to turn its movable arm downward in the drawing when the average density is higher than the nominal density. Therefore, when the average density is not higher than the nominal density, a predetermined target weight set in a target weight register 118 is applied through the switch 116 to the combination arithmetic unit 22 (FIG. 1) for combination selection. Thus, the target weight for the unit 22 is left unchanged and the combination weighing machine continues its operation, so long as the current average density falls between the preset lower threshold and the nominal value.

The average density is further applied to another divider 120 which divides the average density by the nominal density from the register 114 to provide a correction coefficient to a multiplier 122. The multiplier 122 multiplies the target weight from the target weight register 118 by the correction coefficient to provide a corrected target weight. In other words, the target weight is raised with an increase in the average density when the average density is higher than the nominal density and indicates a shortage of the packing volume regardless of acceptable weight. In this case, the switch 116 is turned by the switching signal from the comparator 112, as described above, to apply the corrected raised target weight to the combination weighing machine, thereby raising the weight and, consequently, the volume of each package.

The average density signal may be supplied to a crusher (not shown) to control its crushing rate, thereby adjusting the apparent density of the product before it is fed to the combination weighing machine 12.

What is claimed is:

1. An automatic weighing device for delivering quantities of product having substantial variance in apparent density, each quantity having a weight value equal or approximate to a target weight; said device comprising weighing means for weighing out said quantities of product, means for measuring an apparent density of product fed to said weighing means, and means for controlling said target weight based upon said measured apparent density; characterized in that said target weight controlling means comprises means for calculating a ratio of said measured apparent density to a reference density, means for multiplying said target weight by said calculated ratio to provide a corrected target weight, and means for comparing said measured apparent density with a predetermined lower threshold density and said reference density to actuate alarm means when said measured apparent density is lower than said lower threshold density, to provide the uncorrected target weight to said weighing means when said measured apparent density is between said lower threshold density and said reference density, and to provide said corrected target weight to said weighing means when said measured apparent density is higher than said reference density.

2. An automatic weighing device according to claim 1 characterized in that said apparent density measuring means includes means for sampling and weighing a predetermined volume of said product before it is fed to said weighing means.

3. An automatic weighing device according to claim 1 characterized in that said device further comprises means for crushing said product in accordance with said measured apparent density before the product is fed to said weighing means.

4. An automatic weighing method for delivering quantitites of product having substantial variance in apparent density, each quantity having a weight value equal or approximate to a target weight; said method comprising steps of measuring an apparent density of said product, and controlling said target weight based upon said measured apparent density; characterized in that said target weight controlling step comprises substeps of calculating a ratio of said measured apparent density to a reference density, multiplying said target weight by said calculated ratio to provide a corrected target weight, and comparing said measured apparent density with a predetermined lower threshold density and said reference density, actuating an alarm when said measured apparent density is lower than said lower threshold density, weighing out the product based upon the uncorrected target weight when said measured apparent density is between said lower threshold density and said reference density, and weighing out the product based upon said corrected target weight when said measured apparent density is higher than said reference density.

5. A weighing method according to claim 4, characterized in that said apparent density measuring step is executed by sampling and weighing a predetermined volume of product before the product is fed to the weighing device.

6. A weighing method according to claim 4, characterized in that the product fed to the weighing device is crushed in accordance with said measured apparent density.

* * * * *